US012763386B2

(12) United States Patent
Kim et al.

(10) Patent No.: US 12,763,386 B2
(45) Date of Patent: Oct. 13, 2026

(54) METHOD OF ACTIVATING A LITHIUM SECONDARY BATTERY INCLUDING A POSITIVE ELECTRODE ADDITIVE

(71) Applicant: LG Energy Solution, Ltd., Seoul (KR)

(72) Inventors: Shul Kee Kim, Daejeon (KR); Sang Seung Oh, Daejeon (KR); Hye Hyeon Kim, Daejeon (KR); Chi Ho Jo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 848 days.

(21) Appl. No.: 17/925,654

(22) PCT Filed: Apr. 19, 2022

(86) PCT No.: PCT/KR2022/005581
§ 371 (c)(1),
(2) Date: Nov. 16, 2022

(87) PCT Pub. No.: WO2022/255638
PCT Pub. Date: Dec. 8, 2022

(65) Prior Publication Data

US 2024/0204270 A1 Jun. 20, 2024

(30) Foreign Application Priority Data

Jun. 2, 2021 (KR) ........................ 10-2021-0071222
Apr. 7, 2022 (KR) ........................ 10-2022-0043177

(51) Int. Cl.

| | |
|---|---|
| ***H01M 10/44*** | (2006.01) |
| ***H01M 4/131*** | (2010.01) |
| ***H01M 4/36*** | (2006.01) |
| ***H01M 4/505*** | (2010.01) |
| ***H01M 4/525*** | (2010.01) |
| ***H01M 10/0525*** | (2010.01) |

(52) U.S. Cl.
CPC ......... *H01M 10/446* (2013.01); *H01M 4/131* (2013.01); *H01M 4/364* (2013.01); *H01M 4/505* (2013.01); *H01M 4/525* (2013.01); *H01M 10/0525* (2013.01)

(58) Field of Classification Search
CPC .................................................. H01M 10/446
See application file for complete search history.

(56) References Cited

U.S. PATENT DOCUMENTS

2015/0118524 A1 4/2015 Lee et al.
2015/0228975 A1 8/2015 Lee et al.
2015/0372304 A1 12/2015 Hasegawa et al.
2016/0351905 A1 12/2016 Kawamura et al.
2016/0372784 A1 12/2016 Hayner et al.
2017/0125854 A1* 5/2017 Phan ..................... H01M 4/505
2019/0033380 A1 1/2019 Kim et al.
2019/0074538 A1* 3/2019 Lee ....................... H01M 4/625
2019/0157664 A1 5/2019 Yamamoto et al.
2022/0181627 A1 6/2022 Park et al.
2022/0294037 A1 9/2022 Kim et al.

FOREIGN PATENT DOCUMENTS

CN 104704656 A 6/2015
CN 105940528 A 9/2016
CN 110224169 A 9/2019
CN 112366348 A * 2/2021 ........ H01M 10/0525
JP H06342673 A 12/1994
JP 2010-282874 A 12/2010
JP 2015005350 A 1/2015
JP 2015088268 A 5/2015
JP 2018190504 A 11/2018
JP 2018190565 A 11/2018
JP 2019021445 A 2/2019
JP 2020102309 A 7/2020
KR 20080042966 A 5/2008
KR 20130079109 A 7/2013
KR 20140049650 A 4/2014
KR 20160038593 A * 4/2016 .......... H01M 10/446
KR 101685128 B1 12/2016
KR 101692795 B1 1/2017

(Continued)

OTHER PUBLICATIONS

Search Report dated May 26, 2025 from the Office Action for Chinese Application No. 202280004018.1 Issued May 29, 2025, pp. 1-3.

(Continued)

*Primary Examiner* — Robert S Carrico
(74) *Attorney, Agent, or Firm* — Lerner David LLP

(57) ABSTRACT

A method of activating a lithium secondary battery and a lithium secondary battery prepared by the same are disclosed herein. In some embodiments, a method includes charging the lithium secondary battery to a state of charge (SOC) of 90% or more in an activation step, wherein the lithium secondary battery having an electrode assembly comprising a positive electrode and an electrolyte, wherein the positive electrode comprises a mixture layer having a positive electrode active material and a positive electrode additive, and degassing the lithium secondary battery during the activation step to removing gas inside the secondary battery. The method is advantageous in that a side reaction gas can be removed by performing degassing during activation, thereby forming a stable SEI film on the electrode surface to improve battery performance and battery safety.

8 Claims, No Drawings

(56) References Cited

FOREIGN PATENT DOCUMENTS

| | | | |
|---|---|---|---|
| KR | 20170101582 | A | 9/2017 |
| KR | 20180023696 | A | 3/2018 |
| KR | 20190078517 | A | 7/2019 |
| KR | 20190079534 | A | 7/2019 |
| KR | 20200066048 | A | 6/2020 |
| KR | 20210030000 | A | 3/2021 |
| KR | 20210032205 | A | 3/2021 |
| KR | 20210034985 | A | 3/2021 |
| WO | 2014118834 | A1 | 8/2014 |
| WO | 2017187637 | A1 | 11/2017 |
| WO | 2020111580 | A1 | 6/2020 |

OTHER PUBLICATIONS

International Search Report for Application No. PCT/KR2022/005581 mailed Aug. 1, 2022, pp. 1-3. [See p. 2, categorizing the cited references].
Extended European Search Report including Written Opinion for Application No. 22797248.6 dated Aug. 27, 2024. 6 pgs.

* cited by examiner

METHOD OF ACTIVATING A LITHIUM SECONDARY BATTERY INCLUDING A POSITIVE ELECTRODE ADDITIVE

CROSS-REFERENCE TO RELATED APPLICATIONS

The present application is a national phase entry under 35 U.S.C. § 371 of International Application No. PCT/KR2022/005581, filed on Apr. 19, 2022, which claims priority from Korean Patent Application No. 10-2021-0071222, filed Jun. 2, 2021, and Korean Patent Application No. 10-2022-0043177, filed Apr. 7, 2022, the contents of which are incorporated by reference herein.

TECHNICAL FIELD

The present disclosure relates to a method of activating a lithium secondary battery including a positive electrode additive.

BACKGROUND ART

As technology development and demand for mobile devices increase, the demand for secondary batteries as an energy source is rapidly increasing. Among these secondary batteries, a lithium secondary battery having a high energy density and an operating potential, a long cycle life, and a low self-discharge rate has been commercialized and widely used.

Recently, as lithium secondary batteries are used as power sources for medium and large devices such as electric vehicles, lithium secondary batteries having high capacity, high energy density, and low costs are further required, and there is a need to have a higher irreversible capacity for irreversible additives used for electrodes. However, it is true that there is a limit to the development of a positive electrode additive having such a high irreversible capacity.

Meanwhile, a conventional irreversible additive such as $Li_6CoO_4$ is generally prepared by reacting cobalt oxide, etc. with an excess of lithium oxide. The irreversible additive prepared in this way is structurally unstable and generates a large amount of oxygen gas ($O_2$) as follows as charging proceeds, and when the irreversible additive remains without reacting during the initial charging of the secondary battery, a reaction may occur in the charging and discharging process performed after initial charging to generate a large amount of an oxygen gas inside the battery. Oxygen gas thus generated may cause volume expansion and the like of an electrode assembly, and may be one of the main factors leading to deterioration of battery performance.

$$Li_6CoO_4 \longrightarrow Li_4CoO_4 \xrightarrow{O_2\text{generation}} Li_1CoO_{2.5} \xrightarrow{O_2\text{generation}} CoO_2$$

In addition, the conventionally used irreversible additive exhibits a very low powder electrical conductivity of $10^{-11}$ S/cm, which is close to a non-conductor, due to a 2D percolating network. This low powder electrical conductivity increases the electrical resistance of the positive electrode, and in this case, a large capacity of 200 mAh/g or more is exhibited at a low C-rate, but when the C-rate increases, due to the large resistance as charging/discharging progresses, performance rapidly decreases, so that the charging/discharging capacity of the battery decreases, and there is a limitation in that high-speed charging and discharging is difficult.

Accordingly, there is a demand for the development of a lithium secondary battery having excellent electrical performance as well as improved lithium secondary battery safety.

DISCLOSURE

Technical Problem

Accordingly, an object of the present disclosure is to provide a method of activating a lithium secondary battery, which is capable of improving the electrical performance and safety of the lithium secondary battery.

Technical Solution

In order to solve the above-mentioned problem, in one embodiment, the present disclosure relates to method of activating a lithium secondary battery accommodating an electrode assembly including a positive electrode containing a positive electrode active material and a positive electrode additive and an electrolyte, and the method includes an activation step of charging the lithium secondary battery to 90% or more state of charge (SOC), up to 100%.

In this case, in the activation step, it is characterized in that a degassing process for removing gas inside the secondary battery during charging to 90% or more SOC is performed one or more times.

In one embodiment, the activation step comprises two or more steps according to the SOC level of the lithium secondary battery. In addition, the degassing process is performed between each of the two or more activation steps.

In another embodiment, the activation step comprises a first activation step wherein charging is performed at a rate of 0.5 C or less up to a first level of SOC, and a second activation step wherein charging is performed at a rate of greater than 0.5 C up to a second level of SOC, where the second level is greater than the first level.

In one specific embodiment, the degassing process may be performed twice or three times.

In another embodiment, the activation step may include: activation step 1 of charging the lithium secondary battery to an SOC of 20% or less; activation step 2 of charging the lithium secondary battery having undergone activation step 1 to an SOC greater than 20% and 40% or less; activation step 3 of charging the lithium secondary battery having undergone activation step 2 to an SOC greater than 40% and 70% or less; and activation step 4 of charging the lithium secondary battery having undergone activation step 3 to an SOC of 90% or more. In this case, a degassing process may be performed between at least one of activation steps 1 and 2, steps 2 and 3, or steps 3 and 4.

In a specific embodiment, degassing is performed between activations steps 1 and 2, steps 2 and 3, and steps 3 and 4.

In another specific embodiment, during activation step 1, a rate charging is performed at a condition of 0.5 C or less, and during activation steps 2 to 4, a rate charging is performed at a condition of greater than 0.5 C. For example, during activation step 1, charging the lithium secondary battery is performed with a constant current in the range of 0.01 C to 0.2 C, and during activation steps 2 to 4, charging the lithium secondary battery is performed with a constant current in the range of 0.15 C to 1 C.

In addition, the degassing process may be performed in a vacuum state.

Also, the activation step may further include a step of pressurizing the lithium secondary battery, and the activation step may be performed at a temperature of 40° C. to 70° C. In addition, the activation step may be performed at a voltage of 3.3 V to 4.5 V.

Furthermore, the positive electrode additive may be lithium cobalt oxide represented by the following Chemical Formula 1.

[Chemical Formula 1]

$$Li_pCo_{(1-q)}M^1_qO_4$$

wherein, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, $5 \leq p \leq 7$ and $0 \leq q \leq 0.5$.

Specifically, in Chemical Formula 1, $M^1$ may be Zn, and q may satisfy $0.2 \leq q \leq 0.4$.

In addition, the content of the positive electrode additive may be 0.1 to 5% by weight, based on the total weight of the mixture layer.

In addition, the method may include an aging step of aging the activated lithium secondary battery at a temperature of 40° C. to 80° C. after the activation step.

In addition, in one embodiment, the present disclosure includes an electrode assembly including a positive electrode; negative electrode; a separator disposed between the positive electrode and the negative electrode; and an electrolyte;

wherein the positive electrode has a positive electrode current collector, a positive electrode mixture layer including a positive electrode active material, a positive electrode additive represented by the following Chemical Formula 1, a conductive material, and a binder positioned on the positive electrode current collector, and the positive electrode active material for a lithium secondary battery is a lithium nickel composite oxide represented by the following Chemical Formula 2.

[Chemical Formula 1]

$$Li_pCo_{(1-q)}M^1_qO_4$$

[Chemical Formula 2]

$$Li_x[Ni_yCo_zMn_wM^2_v]O_u$$

wherein, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, $5 \leq p \leq 7$ and $0 \leq q \leq 0.5$.

$M^2$ is at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, $1.0 \leq x \leq 1.30$, $0.1 \leq y < 0.95$, $0.01 < z \leq 0.5$, $0.01 < w \leq 0.5$, $0 \leq v \leq 0.2$, and $1.5 \leq u \leq 4.5$.

In addition, the negative electrode may have a negative electrode current collector, and a negative electrode mixture layer positioned on the negative electrode current collector and containing a negative electrode active material, and the negative electrode active material may contain a carbon material and a silicon material.

Furthermore, the silicon material may be included in an amount of 1 to 20 parts by weight, based on 100 parts by weight of the negative electrode mixture layer.

Advantageous Effects

The method of activating a lithium secondary battery according to the present disclosure can remove a side reaction gas by performing a degassing step in the middle of activation, thereby forming a stable SEI film on the electrode surface to improve battery performance, and there is an advantage of improving the safety of the battery.

BEST MODE

Since the present disclosure can have various changes and can have various embodiments, specific embodiments will be described in detail in the detailed description.

However, this is not intended to limit the present disclosure to specific embodiments, and it should be understood to include all modifications, equivalents and substitutes included in the spirit and scope of the present disclosure.

In the present disclosure, it is to be understood that the terms "include(s)" or "have(has)" and the like are intended to specify the presence of stated features, numbers, steps, operations, components, components or combinations thereof, but do not preclude the presence or addition of one or more other features or numbers, steps, operations, components and combinations thereof.

Further, in the present disclosure, when a portion of a layer, film, region, plate, etc. is described as being "on" another portion, it includes not only the case where the other portion is "directly on" but also the case where there is another portion therebetween. Conversely, where a portion of a layer, film, region, plate, etc. is described as being "under" another portion, this includes the case where there is another portion therebetween as well as "directly under" the other portion. Also, what is referred to herein as being disposed "on" may include being disposed not only on top but also on the bottom.

Hereinafter, the present disclosure will be described in more detail.

Activation Method of Lithium Secondary Battery

In one embodiment, the present disclosure provides a method of activating a lithium secondary battery accommodating an electrode assembly including a positive electrode containing a positive electrode active material and a positive electrode additive and an electrolyte, and the method includes an activation step of charging the lithium secondary battery to a state of charge (SOC) of 90% or more. In the activation step, a degassing process for removing gas inside the secondary battery during charging to 90% SOC or more may be performed at least once.

Specifically, in the activation step, the lithium secondary battery is charged to an SOC of 90% or more, 90 to 100%, 90 to 99.9%, 95 to 100%, or 95 to 99%. In the present disclosure, the activation step includes a case in which the lithium secondary battery is substantially fully buffered.

The method of activating a lithium secondary battery according to the present disclosure targets lithium secondary batteries containing an irreversible additive, i.e. a positive electrode additive, which is added to compensate for lithium ions lost due to an irreversible reaction generated at the negative electrode during initial charging, which has the effect of increasing the dilithiation efficiency of the positive electrode additive contained in the positive electrode during initial charging of the battery.

To this end, the method of activating a lithium secondary battery according to the present disclosure has a configuration including an activation step of charging a lithium secondary battery containing a positive electrode active material together with a positive electrode additive in a positive electrode to 100% SOC, and performing, at least once, a degassing step of removing gas inside the lithium secondary battery in the middle of the activation step. In general, a lithium secondary battery generates a large amount of gas inside due to dilithiation and/or decomposition of the positive electrode additive contained in the positive electrode mixture layer, and may cause volume expansion or the like of the electrode assembly unless it is removed, resulting in a decrease in battery performance. In the present disclosure, by performing the degassing process one or more times in the middle of the activation step, volume expansion of the electrode assembly can be prevented and the content of the total amount of gas generated during charging can be reduced. That is, the performance of the battery can be improved by removing the side reaction gas by the degassing process in the middle of the activation step to form a strong SEI film by reducing the resistance between the electrolyte and the electrode interface.

In one example, the activation step is divided into two or more steps according to the SOC level of the lithium secondary battery. In addition, the degassing process is performed between steps divided according to the SOC level of the lithium secondary battery. In a specific example, the degassing process may be performed twice or three times.

In another embodiment, the activation step is divided into two or more steps according to the SOC level of the lithium secondary battery, and in the initial stage when the SOC level is low, a low rate charging of 0.5 C or less may be performed, and in later stages when the SOC level is higher, high rate charging greater than 0.5 C may be performed. Specifically, in the initial stage, the low rate charging is performed in the range of 0.1 to 0.5 C, in the range of 0.1 to 0.4 C, or in the range of 0.15 to 0.3 C. In addition, in the later stages when the SOC level is higher, high rate charging is performed in the range of greater than 0.5 and 10 C or less, in the range of 0.8 to 5 C, or in the range of 0.8 to 1.2 C. This is to induce the stable formation of the SEI film through low rate charging at the initial stage of charging, and to increase process efficiency through high rate charging at the later stages of charging.

Meanwhile, in one embodiment, in the method of activating a lithium secondary battery according to the present disclosure, the activation step may include a total of 4 steps. In a specific example, the present disclosure may include activation step 1 of charging the lithium secondary battery to an SOC of 20% or less; activation step 2 of charging the lithium secondary battery having undergone activation step 1 to an SOC greater than 20% and 40% or less; activation step 3 of charging the lithium secondary battery having undergone activation step 2 to an SOC greater than 40% and 70% or less; and activation step 4 of charging the lithium secondary battery having undergone activation step 3 to an SOC of 100%. In this case, after at least one of activation steps 1 to 3, a degassing process may be performed.

In a lithium secondary battery, when the initial charging is performed, lithium ions derived from lithium transition metal oxides such as the positive electrode active material and positive electrode additive contained in the positive electrode move to the carbon electrode of the negative electrode, and since the lithium ion is highly reactive, it reacts with the carbon negative electrode to produce a compound such as $Li_2CO_3$, LiO and LiOH, and an SEI film is formed on the surface of the negative electrode by such a compound. The SEI film is a non-conductor formed when the ion movement amount of the battery increases, and when the SEI film is formed, it prevents lithium ions from reacting with other materials in the negative electrode during subsequent secondary battery charging, and plays a role of allowing only lithium ions to pass by functioning as a kind of ion tunnel. When such a SEI film is formed, the lithium ions do not react with the negative electrode or other materials, so that the amount of lithium ions is reversibly maintained and the charging and discharging of the secondary battery are reversibly maintained, whereby the lifetime of a secondary battery can be improved, and the battery is less likely to collapse even if it is left at a high temperature or is repeatedly charged and discharged, and therefore, there is less of a variation in the thickness of the battery.

Activation step 1 of the present disclosure may be referred to as a step in which lithium ions derived from the positive electrode active material and/or positive electrode additive of the positive electrode form a solid electrolyte interphase (SEI) film on the surface of the negative electrode. In addition, activation step 2 may be referred to as a step of applying a current to the lithium secondary battery having undergone activation step 1 to induce dilithiation and decomposition of the lithium ions of the positive electrode additive, thereby charging the battery and at the same time forming a gas derived from the positive electrode additive inside the battery. In addition, activation step 3 and activation step 4 may be referred to as a step of applying a current to the lithium secondary battery having undergone activation step 2 to finish the initial charging of the battery such that the SOC is satisfied at a certain level.

Meanwhile, in the method of activating a lithium secondary battery according to the present disclosure, a degassing process may be performed after one or more of activation steps 1 to 3. Alternatively, in the method of activating a lithium secondary battery according to the present disclosure, after each of activation steps 1 to 3, the degassing process may be sequentially performed. In a specific example, the method of activating a lithium secondary battery according to the present disclosure may include:

activation step 1→degassing process→activation step 2→activation step 3→activation step 4;

activation step 1→activation step 2→degassing process→activation step 3→activation step 4;

activation step 1→degassing process→activation step 2→degassing process→activation step 3→activation step 4;

activation step 1→degassing process→activation step 2→activation step 3→degassing process→activation step 4;

activation step 1→activation step 2→degassing process→activation step 3→degassing process→activation step 4; or Activation step 1→degassing process→activation step 2→degassing process→activation step 3→degassing process→activation step 4 and the like.

Meanwhile, the activation step may include pressurizing the lithium secondary battery. In a specific example, in the activation step of the lithium secondary battery containing the positive electrode additive of Chemical Formula 1, by including the step of pressurizing the lithium secondary battery during the charging process, it is possible to allow the gas generated in the activation step to be discharged to the outside of the battery without remaining inside the battery. That is, the process of charging the lithium secondary battery to 100% SOC may be performed under a pressurized condition in which a predetermined pressure is applied. Here, pressurizing the lithium secondary battery means pressurizing the portion in which the electrode assembly is accommodated, and gas generated during the activation process by pressurizing the lithium secondary battery may be collected in a gas pocket.

The pressurizing process can pressurize the lithium secondary battery using a conventional pressurizing member such as a pressurizing jig. In this case, the pressure applied to the lithium secondary battery may be in the range of greater than 0 $kgf/cm^2$ and 20 $kgf/cm^2$ or less, or in the range of 0.5 $kgf/cm^2$ to 15 $kgf/cm^2$ or 1 $kgf/cm^2$ to 10 $kgf/cm^2$. When the pressure is too high, the battery may be damaged by the excessive pressure.

In addition, the degassing process removes gas inside the lithium secondary battery, and a method generally used in the battery field may be performed without limitation. The degassing process may include the pressurizing process described above. For example, in the activation step, a hole is formed by piercing a gas pocket, and a chamber in which the lithium secondary battery is accommodated is created in a vacuum state to discharge the lithium secondary battery gas to the outside through the hole to be removed. In addition, the open part can be sealed.

In another example, when the degassing process is sequentially performed after each activation step, the gas may be removed under the same conditions in each degassing process, or the gas may be removed under different conditions.

As described above, activation step 2 is a step in which the gas originating from the positive electrode additive is formed, and in activation steps 2 to 4, a degassing process that is longer than activation step 1 may be performed, or a greater pressure may be applied during charging. However, the present disclosure is not limited thereto.

In addition, in activation step 1, out low rate charging may be performed at a condition of 0.5 C or less, and in activation steps 2 to 4, high rate charging may be performed at a condition of greater than 0.5 C. Specifically, in activation step 1, charging of the lithium secondary battery may be performed in the range of 0.1 to 0.5 C, in the range of 0.1 to 0.4 C, or in the range of 0.15 to 0.3 C. In addition, in activation steps 2 to 4, charging of the lithium secondary battery may be performed in a range of greater than 0.5 and less than 10 C, in a range of 0.8 to 5 C, or in a range of 0.8 to 1.2 C. In this case, by performing charging with a low constant current in activation step 1 and charging with a relatively high constant current in activation steps 2 to 4, stability and process efficiency of the battery may be simultaneously increased.

In addition, the activation step may be performed under a voltage condition of 0.1V to 4.5V. The voltage condition in the activation step is a charging voltage, and as an example, activation step 1 may be performed under a voltage condition of 3.3 V to 3.6 V, and activation steps 2 to 4 can be performed under voltage condition of 3.4 V to 3.7 V, respectively.

In the present disclosure, the SEI film can be uniformly formed in activation step 1 by controlling the voltage conditions of each activation step as described above, and the phase change of the positive electrode additive may be promoted while maintaining the redox reaction of a positive electrode active material, i.e., the reversible reaction rate of a positive electrode active material, in activation steps 2 to 4 after an SEI film is formed, thereby inducing the dilithiation of the positive electrode additive at a high rate during initial charging. In addition, in activation steps 2 to 4, charging can be performed under a low voltage condition outside the above-described voltage condition to prevent the irreversible reaction of the positive electrode additive from being sufficiently induced, and charging may be performed at a high voltage outside the above-described voltage condition, to prevent a problem that the lifetime and capacity of the battery are lowered, and an excessive amount of gas is instantaneously generated to lower safety.

In addition, the method of activating a lithium secondary battery according to the present disclosure may increase the SOC step by step while performing each activation step. For example, the SOC of the lithium secondary battery in which activation step 1 is performed may be 10% or less for the formation of an SEI film, and the SOC of the lithium secondary battery in which activation step 2 is performed may be more than 10% and 40% or less by sufficiently inducing an irreversible reaction of the positive electrode additive, so that gas is generated in the battery, and the SOC of the lithium secondary battery in which activation step 3 is performed may be more than 40% and less than or equal to 70%.

As an example, the method of activating a lithium secondary battery according to the present disclosure can adjust the SOC of activation step 1 to 10 to 18%, the SOC of activation step 2 to 30 to 38%, and the SOC of activation step 3 to 60 to 70%, and the SOC of activation step 4 to 100%.

In addition, each activation step may be performed at a temperature higher than room temperature in order to lower the resistance of the electrode. Specifically, each activation step may be performed under a temperature condition of 40° C. to 70° C., and more specifically, 40° C. to 60° C.; 45° C. to 60° C.; 50° C. to 65° C.; 50° C. to 60° C. or 52° C. to 58° C. In the present disclosure, since the secondary battery can be charged under a lower resistance condition of the positive electrode by performing each activation step under a temperature condition satisfying the above range, the efficiency of the activation step may be increased, and the uniformity of the SEI film formed in activation step 1 may be improved.

In addition, the execution time of each activation step may be performed for 1 min to 100 min, and specifically, 1 min to 100 min; 1 min to 60 min; 1 min to 40 min; 10 to 40 min; 20 to 40 min; 10 to 30 min; 1 min to 10 min; and 2 to 9 min.

As an example, activation step 1 may be performed for 2 to 8 min, activation step 2 may be performed for 30 to 39 min, and activation step 3 may be performed for 21 to 29 min, but are not limited thereto.

In addition, the method of activating a lithium secondary battery according to the present disclosure may further include an aging step of aging the activated lithium secondary battery after activation step 3. The aging step may allow the SEI film to be more stabilized and re-formed to a uniform thickness by thermal energy and electrochemical energy. To this end, the aging step may be performed at 40 to 80° C., 50 to 70° C., 55 to 65° C., or about 60° C. for 0.5 to 30 h.

Furthermore, a degassing process may be performed to remove gas generated in the lithium secondary battery after activation step 4 or after the aging step. Since the gas generated inside the battery may cause swelling of the battery, a degassing process may be performed to remove the generated gas.

Lithium Secondary Battery

According to one embodiment, the present disclosure provides a lithium secondary battery including an electrode assembly including:

a positive electrode;

a negative electrode;

a separator disposed between the positive electrode and the negative electrode; and an electrolyte In this case, the positive electrode includes a positive electrode current collector, and a positive electrode mixture layer prepared by coating, drying, and pressing a positive electrode slurry on the positive electrode current collector, and the positive electrode mixture layer has a structure containing a positive electrode active material, a positive electrode additive, a conductive material, and a binder.

In a specific example, the positive electrode additive may be a lithium cobalt oxide represented by the following Chemical Formula 1:

[Chemical Formula 1]

$$Li_pCo_{(1-q)}M^1_qO_4$$

wherein, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and p and q are $5 \leq p \leq 7$ and $0 \leq q \leq 0.5$, respectively.

Specifically, in Chemical Formula 1, $M^1$ may be a Zn element, and q may be $0.2 \leq q \leq 0.4$.

The positive electrode additive may contain lithium in excess to provide lithium for lithium consumption resulting from irreversible chemical and physical reactions at the negative electrode upon initial charging, thereby increasing the charging capacity of the battery and decreasing the irreversible capacity to improve lifetime characteristics.

As such a positive electrode additive, the present disclosure may include a lithium cobalt oxide represented by Chemical Formula 1, wherein, as the lithium cobalt oxide represented by Chemical Formula 1, $Li_6CoO_4$, $Li_6Co_{0.5}Zn_{0.5}O_4$, $Li_6Co_{0.7}Zn_{0.3}O_4$, etc. may used alone or in combination. The lithium cobalt oxide represented by Chemical Formula 1 has an advantage in that the content of lithium ions is high, the voltage range required for dilithiation is low, and lithium ions may be deintercalated without affecting the reaction of the positive electrode active material during activation of the battery, as compared with nickel-containing oxides commonly used in the art.

In addition, the lithium cobalt metal oxide represented by Chemical Formula 1 may have a tetragonal crystal structure, and among them, may have a space group of $P4_2/nmc$. In general, a lithium metal oxide having a tetragonal crystal structure has a structurally unstable structure due to the distortion of the tetrahedral structure formed by the cobalt element and the oxygen element, and this structural instability causes a problem that gas containing oxygen gas is generated even during charging after activation of the battery. In the present disclosure, since the decomposition and/or dilithiation efficiency of the positive electrode additive during initial charging can be significantly improved by continuously performing the three-stage activation step under current and voltage conditions satisfying a specific range, not only the charging and discharging capacity of the lithium secondary battery may be improved but also the amount of oxygen gas ($O_2$) generated during charging and discharging after initial charging may be significantly reduced.

In addition, the content of the positive electrode additive may be 0.1 to 5 parts by weight, specifically, 0.1 to 3 parts by weight; or 1 to 3 parts by weight, based on a total of 100 parts by weight of the positive electrode mixture layer.

Furthermore, the mixture layer may further include a conductive material, a binder, an additive, and the like, together with the positive electrode active material and the positive electrode additive.

Meanwhile, the positive electrode used in the present disclosure includes a mixture layer formed on a current collector, and the mixture layer includes a positive electrode active material exhibiting electrical activity and a positive electrode additive imparting irreversible capacity.

The positive electrode mixture layer is a positive electrode active material capable of reversible intercalation and deintercalation, and may include a lithium nickel composite oxide represented by Chemical Formula 2 below:

[Chemical Formula 2]

$$Li_x[Ni_yCo_zMn_wM^2_v]O_u$$

wherein, $M^2$ is at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and x, y, z, w, v and u are $1.0 \leq x \leq 1.30$, $0.1 \leq y < 0.95$, $0.01 < z \leq 0.5$, $0.01 < w \leq 0.5$, $0 \leq v \leq 0.2$, $1.5 \leq u \leq 4.5$, respectively.

The lithium nickel composite oxide represented by Chemical Formula 2 is a composite metal oxide including lithium, nickel, cobalt, and manganese, and in some cases, may have a form in which another transition metal ($M^2$) is doped. For example, the positive electrode active material may include at least one compound selected from the group consisting of $LiNi_{1/3}CO_{1/3}Mn_{1/3}O_2$, $LiNi_{0.6}Co_{0.2}Mn_{0.2}O_2$, $LiNi_{0.8}Co_{0.1}Mn_{0.1}O_2$, $LiNi_{0.9}Co_{0.05}Mn_{0.05}O_2$, $LiNi_{0.8}Co_{0.1}Mn_{0.05}Al_{0.05}O_2$ and $LiNi_{0.7}Co_{0.1}Mn_{0.1}Al_{0.1}O_2$. As an example, the positive electrode active material is the lithium nickel cobalt oxide represented by Chemical Formula 2, and $LiNi_{0.6}Co_{0.2}Mn_{0.2}O_2$ or $LiNi_{0.8}Co_{0.1}Mn_{0.1}O_2$ may be used alone or in combination.

In addition, the content of the positive electrode active material may be 85 to 95 parts by weight, specifically 88 to 95 parts by weight, 90 to 95 parts by weight, 86 to 90 parts by weight or 92 to 95 parts by weight, based on 100 parts by weight of the mixture layer.

In this case, the conductive material may be used to improve the performance of the positive electrode, such as electrical conductivity, and one or more material selected from the group consisting of natural graphite, artificial graphite, carbon black, acetylene black, ketjen black, and carbon fiber may be used as the conductive material. For example, the conductive material may include acetylene black.

In addition, the conductive material may be included in an amount of 1 to 10 parts by weight, specifically, 2 to 8 parts by weight; or 2 to 6 parts by weight, based on 100 parts by weight of the mixture layer.

In addition, the binder may include one or more resins selected from the group consisting of a polyvinylidene fluoride-hexafluoropropylene copolymer (PVDF-co-HFP), polyvinylidene fluoride, polyacrylonitrile, polymethylmethacrylate, and copolymers thereof. As an example, the binder may include polyvinylidene fluoride.

In addition, the binder may be included in amount of 1 to 10 parts, specifically, 1 to 8 parts by weight; or 1 to 6 parts by weight, based on 100 parts by weight of the mixture layer.

In addition, the average thickness of the mixture layer is not particularly limited, and specifically, may be 50 μm to 300 μm, more specifically 100 μm to 200 μm; 80 μm to 150 μm; 120 μm to 170 μm; 150 μm to 300 μm; 200 μm to 300 μm; or 150 μm to 190 μm.

In addition, in the positive electrode, as the current collector, one having high conductivity without causing a chemical change in the battery may be used. For example, stainless steel, aluminum, nickel, titanium, calcined carbon, etc. may be used, and in the case of aluminum or stainless steel, one whose surface is treated with carbon, nickel, titanium, silver, or the like may be used. In addition, fine irregularities may be formed on the surface of the electrode current collector to increase the adhesion of the positive electrode active material, and various forms such as a film, a sheet, a foil, a net, a porous body, a foam, and a nonwoven body are possible. In addition, the average thickness of the current collector may be appropriately applied in a range of 3 to 500 μm in consideration of the conductivity and total thickness of the positive electrode to be manufactured.

In addition, the negative electrode of the lithium secondary battery used in the present disclosure is prepared by coating, drying and pressing the negative electrode active material on the negative electrode current collector, and if necessary, a conductive material as in the positive electrode, an organic binder polymer, an additive, etc. as described above may be optionally further included.

In addition, as the negative electrode active material, for example, graphite having a completely layered crystal structure such as natural graphite, and soft carbon having a low crystallinity layered crystal structure (graphene structure; a structure in which hexagonal honeycomb planes of carbon are arranged in layers) and graphite materials such as hard carbon, artificial graphite, expanded graphite, carbon fiber, non-graphitizable carbon, carbon black, carbon nanotube, fullerene, activated carbon, etc. in which carbon and these structures are mixed with amorphous parts; metal complex oxides such as $LixFe_2O_3$ ($0 \leq x \leq 1$), $LixWO_2$ ($0 \leq x \leq 1$), SnxMe1-xMe'yOz (Me: Mn, Fe, Pb, Ge; Me', Al, B, P, Si, Group 1, Group 2 and Group 3 elements of the periodic table, and halogens; $0<x\leq 1$; $1\leq y\leq 3$; $1\leq z\leq 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers such as polyacetylene; Li—Co—Ni-based materials; titanium oxide; lithium titanium oxide and the like may be used.

As an example, the negative electrode active material may include both graphite and silicon (Si)-containing particles, and the graphite includes at least one of natural graphite having a layered crystal structure and artificial graphite having an isotropic structure, and the silicon (Si)-containing particles may include particles mainly containing silicon (Si) as a metal component, such as silicon (Si) particles, SiO particles, $SiO_2$ particles, or a mixture of one or more of these particles.

At this time, the negative electrode active material may include 80 to 95 parts by weight of graphite; and 1 to 20 parts by weight of silicon (Si)-containing particles, based on a total of 100 parts by weight. The present disclosure can improve the charge capacity per unit mass while reducing the lithium consumption and irreversible capacity loss during initial charging/discharging of the battery by adjusting the content of graphite and silicon (Si)-containing particles contained in the negative electrode active material to the above range.

In addition, the negative electrode mixture layer may have an average thickness of 100 μm to 200 μm, specifically, 100 μm to 180 μm, 100 μm to 150 μm, 120 μm to 200 μm, 140 μm to 200 μm, or 140 μm to 160 μm.

In addition, the negative electrode current collector is not particularly limited as long as it has high conductivity without causing a chemical change in the battery, and for example, copper, stainless steel, nickel, titanium, calcined carbon, etc. may be used, and in the case of copper or stainless steel, one whose surface is treated with carbon, nickel, titanium, silver, etc. may be used. In addition, the negative electrode current collector, like the positive electrode current collector, may have fine irregularities formed on the surface thereof to strengthen the bonding force with the negative electrode active material, and may take various forms such as films, sheets, foils, nets, porous materials, foams, non-woven materials, etc. In addition, the average thickness of the negative electrode current collector may be appropriately applied in a range of 3 to 500 μm in consideration of the conductivity and total thickness of the negative electrode to be manufactured.

In addition, the separator is interposed between the negative electrode and the positive electrode, and an insulating thin film having high ion permeability and mechanical strength is used. Although the separator is not particularly limited as long as it is conventionally used in the art, specifically, a sheet or nonwoven fabric made of chemical-resistant and hydrophobic polypropylene; glass fiber; polyethylene or the like may be used, and in some cases, a composite separator in which a porous polymer substrate such as a sheet or nonwoven fabric is coated with inorganic particles/organic particles by an organic binder polymer may be used. When a solid electrolyte such as a polymer is used as the electrolyte, the solid electrolyte may also serve as a separator. In addition, the separator may have an average pore diameter of 0.01 to 10 μm, and an average thickness of 5 to 300 μm.

Meanwhile, the positive electrode and the negative electrode may be wound in the form of a jelly roll and accommodated in a cylindrical battery, a prismatic battery, or a pouch-type battery, or may be accommodated in a pouch-type battery in a folding or stack-and-folding form, but is not limited thereto.

In addition, a lithium salt-containing electrolyte according to the present disclosure may consist of an electrolyte and a lithium salt, and as the electrolyte, a non-aqueous organic solvent, an organic solid electrolyte, an inorganic solid electrolyte, and the like may be used.

Specifically, the electrolyte may contain a compound represented by the following Chemical Formula 3:

[Chemical Formula 3]

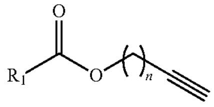

wherein, $R_1$ is a substituted or unsubstituted C1-4 alkylamine group; a substituted or unsubstituted 4-7 ring heteroalkyl group; or a substituted or unsubstituted 4-7 ring heteroaryl group, wherein the heteroalkyl group and the heteroaryl group contain at least one nitrogen atom (N), n is an integer from 1 to 4.

Specifically, in the compound represented by Formula 3, $R_1$ is a dimethylamine group, a diethylamine group, a diisopropylamine group, a pyrrolidyl group, a piperidyl group, a piperazinyl group, a morpholinyl group, pyrrolyl group or imidazolyl group, wherein one or more hydrogens present in the pyrrolidyl group, piperidyl group, piperazinyl group, morpholinyl group, pyrrolyl group and imidazolyl group are unsubstituted or may be substituted with an C1-4 alkyl group or a nitrile group, and n is 1 or 2.

As an example, the compound represented by Formula 3 may be a compound represented by Formula 4 below:

[Chemical Formula 4]

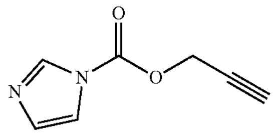

The compound represented by Chemical Formula 4 may strengthen the SEI film formed on the surface of the negative electrode by including a triple bond at the terminal, and may suppress side reactions of the electrolyte by adsorbing and removing impurities such as metal foreign substances present in the electrolyte. In addition, R1 of the compound stabilizes the lithium salt using a nitrogen atom contained in an alkylamine group, a heteroalkyl group, or a heteroaryl group, thereby inhibiting the generation of decomposition products such as HF and PF5 in the electrolyte, so it is possible to prevent the battery from being deteriorated and the voltage from being lowered due to acidic HF, PF5, etc. Above all, R1 stabilizes the reaction site of the positive electrode additive contained in the positive electrode mixture layer to prevent a decrease in electrode resistance of the positive electrode due to the positive electrode additive, while improving the charging/discharging capacity of the battery.

As the non-aqueous organic solvent, for example, an aprotic organic solvent such as N-methyl-2-pyrrolidinone, ethylene carbonate, propylene carbonate, butylene carbonate, dimethyl carbonate, diethyl carbonate, gamma-butyrolactone, 1,2-dimethoxyethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, a dioxolane derivative, sulfolane, methyl sulfolane, 1,3-dimethyl-2-imidazolidinone, a propylene carbonate derivative, a tetrahydrofuran derivative, ether, methyl propionate or ethyl propionate may be used.

As the organic solid electrolyte, for example polyethylene derivatives, polyethylene oxide derivatives, polypropylene oxide derivatives, phosphoric acid ester polymers, poly agitation lysine, polyester sulfide, polyvinyl alcohol, polyvinylidene fluoride, a polymeric material including an ionic dissociating group and the like may be used.

As the inorganic solid electrolyte, nitrides, halides, sulfates, and the like of Li, such as $Li_3N$, LiI, $Li_5Ni_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$ may be used.

The lithium salt is a material that is easily soluble in the non-aqueous electrolyte, and for example, LiCl, LiBr, LiI, $LiClO_4$, $LiBF_4$, $LiB10Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lithium lower aliphatic carboxylates, lithium tetraphenylborate, imide and the like may be used.

In addition, for the purpose of improving charging/discharging characteristics, flame retardancy, etc., for example, pyridine, triethylphosphite, triethanolamine, cyclic ether, ethylene diamine, n-glyme, hexaphosphate triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxyethanol, aluminum trichloride and the like may be added to the electrolyte. In some cases, in order to impart incombustibility, a halogen-containing solvent such as carbon tetrachloride and ethylene trifluoride may be further included, and carbon dioxide gas may be further included to improve high temperature storage characteristics, and fluoro-ethylene carbonate (FEC), propene sultone (PRS), etc. may be further included.

Meanwhile, the positive electrode and the negative electrode may be wound in the form of a jelly roll and accommodated in a cylindrical battery, a prismatic battery, or a pouch-type battery, or may be accommodated in a pouch-type battery in a folding or stack-and-folding form. For example, the lithium secondary battery according to the present disclosure may be a pouch-type battery.

MODE FOR INVENTION

Hereinafter, the present disclosure will be described in detail by way of Examples.

However, the following Examples and Experimental Examples are merely illustrative of the present disclosure, and the content of the present disclosure is not limited to the following Examples and Experimental Examples.

Manufacturing Example: Manufacture of Lithium Secondary Battery 95 parts by weight of $LiNi_{0.8}Co_{0.1}Mn_{0.1}O_2$ as a positive electrode active material, 0.9 parts by weight of $Li_6Co_{0.7}Zn_{0.3}O_4$ as a positive electrode additive, 1.6 parts by weight of PVdF as a binder, and 2.5 parts by weight of carbon black as a conductive material were weighed and mixed in an N-methylpyrrolidone (NMP) solvent to prepare a slurry for a positive electrode mixture layer. The slurry for the mixture layer was applied to aluminum foil, dried, and then rolled to form a positive electrode having a positive electrode mixture layer (average thickness: 130 μm).

85 parts by weight of natural graphite as a carbon-based active material, 5 parts by weight of SiO (silicon oxide) as a silicon-based active material, 6 parts by weight of carbon black as a conductive material and 4 parts by weight of PVDF as a binder were mixed in an N-methylpyrrolidone solvent to prepare a negative electrode slurry for a mixture layer, and this was applied on a copper foil to prepare a negative electrode having a negative electrode mixture layer (average thickness: 80 μm).

An electrode assembly was manufactured by laminating a separator (thickness: about 16 μm) made of a porous polyethylene (PE) film between the manufactured positive electrode and the negative electrode. After the electrode assembly was placed inside the battery case, an electrolyte was injected into the case, and then left at room temperature for 3 days so that the electrolyte was sufficiently impregnated to manufacture a lithium secondary battery. E2DVC containing a compound represented by the following Chemical Formula 4 as an electrolyte additive was injected to prepare a full cell type cell. At this time, the compound represented by Formula 4 was weighed so as to contain 1% by weight, based on the electrolyte.

Here, “E2DVC” is a kind of carbonate-based electrolyte, and means a solution obtained by mixing lithium hexafluorophosphate ($LiPF_6$, 1.0 M) and vinylcarbonate (VC, 2% by weight) in a mixture of ethylene carbonate (EC):dimethyl carbonate (DMC):diethyl carbonate (DEC)=1:1:1 (volume ratio).

[Chemical Formula 4]

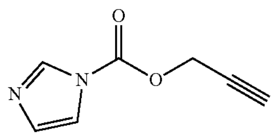

tion step was performed while the lithium secondary battery was pressurized with a pressurizing jig, and gas inside the lithium secondary battery was collected in the gas pocket. In addition, in the degassing process, a hole was formed by piercing the gas pocket, and a negative pressure of −5 to −90 kPa was applied to remove the gas collected in the gas pocket. After the activation step, the lithium secondary battery was aged at a temperature of 60° C. for 24 hours, and the aged lithium secondary batteries were degassed.

Comparative Example 1: Activation of Lithium Secondary Battery

A lithium secondary battery manufactured in Manufacturing Example was charged at 0.3 C for 10 hours until it reached 4.3 V to carry out an activation step of the secondary battery. In addition, after the activation step, the gas in the battery was degassed using a jig.

TABLE 1

| Classification | | Example 1 | Example 2 | Example 3 | Example 4 | Example 5 | Example 6 | Comparative Example 1 |
|---|---|---|---|---|---|---|---|---|
| Activation Step 1 | SOC | 6% | 6% | 6% | 6% | 6% | 6% | 6% |
| | Pressurizing pressure | ≤1 $kgf/cm^2$ | ≤1 $kgf/cm^2$ | ≤1 $kgf/cm^2$ | ≤1 $kgf/cm^2$ | ≤1 $kgf/cm^2$ | ≤1 $kgf/cm^2$ | ≤1 $kgf/cm^2$ |
| Degassing process | Performed or not | ○ | ○ | ○ | ○ | X | X | X |
| Activation Step 2 | SOC | 35% | 35% | 35% | 35% | 35% | 35% | 35% |
| | Pressurizing pressure | ≥1 $kgf/cm^2$ | ≥1 $kgf/cm^2$ | ≥1 $kgf/cm^2$ | ≥1 $kgf/cm^2$ | ≥1 $kgf/cm^2$ | ≥1 $kgf/cm^2$ | ≥1 $kgf/cm^2$ |
| Degassing process | Performed or not | ○ | X | X | ○ | ○ | X | X |
| Activation step 3 | SOC | 60% | 60% | 60% | 60% | 60% | 60% | 60% |
| | Pressurizing pressure | ≥1 $kgf/cm^2$ | ≥1 $kgf/cm^2$ | ≥1 $kgf/cm^2$ | ≥1 $kgf/cm^2$ | ≥1 $kgf/cm^2$ | ≥1 $kgf/cm^2$ | ≥1 $kgf/cm^2$ |
| Degassing process | Performed or not | ○ | ○ | X | X | ○ | ○ | X |
| Activation step 4 | SOC | 100% | 100% | 100% | 100% | 100% | 100% | 100% |
| | Pressurizing pressure | ≥1 $kgf/cm^2$ | ≥1 $kgf/cm^2$ | ≥1 $kgf/cm^2$ | ≥1 $kgf/cm^2$ | ≥1 $kgf/cm^2$ | ≥1 $kgf/cm^2$ | ≥1 $kgf/cm^2$ |

Examples 1 to 6: Activation of Lithium Secondary Battery

The activation step was performed on the lithium secondary battery manufactured in Manufacturing Example. At this time, the temperature of each activation step was performed at 55° C. Meanwhile, activation step 1 was performed under 0.2 C and 3.4 V conditions, and activation steps 2 to 4 were performed under 1 C and 3.6 V conditions. Table 1 shows the time for each activation step, whether the degassing process is performed, and whether the pressurization process is performed in the activation step. Meanwhile, the activa-

Experimental Example

In order to evaluate the performance difference of the lithium secondary battery due to the activation method, the following experiment was performed.

A) Analysis of the Content of Gas Generated in the Activation Step

The content of the gas generated inside and the content of the total gas during the activation process (formation) of the lithium secondary batteries according to Examples and Comparative Example were analyzed. Also, the results are shown in Table 2 below.

TABLE 2

| Gas generation amount in the degassing process [μl] | Example 1 | Example 2 | Example 3 | Example 4 | Example 5 | Example 6 | Comparative Example 1 |
|---|---|---|---|---|---|---|---|
| After activation step 1 | 42 | 41 | 42 | 41 | — | — | — |
| After activation step 2 | 28 | — | — | 29 | 61 | — | — |
| After activation step 3 | 26 | 50 | — | — | 24 | 78 | — |

TABLE 2-continued

| Gas generation amount in the degassing process [μl] | Example 1 | Example 2 | Example 3 | Example 4 | Example 5 | Example 6 | Comparative Example 1 |
|---|---|---|---|---|---|---|---|
| After activation step 4 | 31 | 28 | 62 | 50 | 29 | 27 | 98 |
| Total gas generation amount | 127 | 119 | 104 | 120 | 114 | 105 | 98 |

As shown in Table 2, the lithium secondary batteries activated according to the conditions of Examples had a higher total gas generation amount compared to the lithium secondary battery activated according to Comparative Example. In addition, Example 1, in which the degassing process was performed after each activation step, had a higher total gas generation amount compared to Examples 2-6. Furthermore, as seen from Examples 2, 4 and 5 in which the degassing step was performed two times in total in the activation step, the lithium secondary batteries of Examples 2 and 4 in which degassing process were performed after activation step 1 had a larger total gas generation amount as compared with the lithium secondary battery of Example 5. In general, since SEI formation is most active in activation step 1, the lithium secondary batteries of Examples 2 and 4, which were subjected to a degassing process after activation step 1, seem to have a higher total gas generation amount compared to the lithium secondary batteries of Example 5.

In the lithium secondary battery activated according to the conditions of Examples, a degassing process may be performed during the activation step to easily remove gas generated in the lithium secondary battery. In particular, it seems that the performance of the lithium secondary battery may be improved by preventing the gas generated in the secondary battery from interfering with the SEI formation or participating in a side reaction through this process.

B) Initial Resistance Value Evaluation

The resistance of each of the activated lithium secondary batteries in the Examples and Comparative Example was measured while discharging at a C-rate of 2 C at 50% SOC for 10 seconds, and the results are shown in Table 3.

TABLE 3

| Classification | Resistance (Ω) |
|---|---|
| Example 1 | 0.84 |
| Example 2 | 0.85 |
| Example 3 | 0.86 |
| Example 4 | 0.85 |
| Example 5 | 0.93 |
| Example 6 | 0.92 |
| Comparative Example 1 | 1.04 |

As shown in Table 3, in the case of the lithium secondary batteries activated according to Examples, it was confirmed that the resistance value was lower than that of the Comparative Example. In particular, the resistance values of the lithium secondary batteries of Examples 1 to 4, which were subjected to the degassing process after activation step 1, were lower than those of Examples 5 to 6. This is believed to have caused the electrode-electrolyte reaction to be uniform by removing the side reaction gas inside the lithium secondary battery to increase the impregnability of the electrolyte.

C) Evaluation of Cycle Life Performance

The lithium secondary batteries activated in Examples and Comparative Example were each discharged to a cut-off voltage of 2 V with a discharge current of 0.1 C, and the initial charging/discharging capacity per unit mass was measured.

Then, the charging and discharging capacity was measured while repeatedly performing charging and discharging 100 times at 45° C. under 0.3 C conditions, and the charging/discharging capacity retention rate was calculated after performing charging and discharging 100 times. The results are shown in Table 4 below.

TABLE 4

| Classification | Initial charging/discharging capacity [mAh] | Capacity retention rate (%) |
|---|---|---|
| Example 1 | 102.0 | 96.2 |
| Example 2 | 101.9 | 96.0 |
| Example 3 | 102.0 | 95.8 |
| Example 4 | 101.8 | 95.7 |
| Example 5 | 100.5 | 93.5 |
| Example 6 | 100.6 | 93.5 |
| Comparative Example 1 | 98.7 | 89.1 |

Referring to Table 4, the lithium secondary batteries activated according to Example have an initial charging/discharging capacity of 100 mAh or more, and the capacity retention rate after 100 times of charging and discharging is 90% or more, whereas it was confirmed that the lithium secondary battery activated according to the Comparative Example has an initial charging/discharging capacity and a capacity retention rate after 100 times of charging/discharging that are lower than those of Examples.

In the case of the lithium secondary battery activated according to Examples, the SEI film stably formed by removing the side reaction gas according to the increase in SOC during activation was not decomposed by an additional electrolyte decomposition reaction, etc. and was well maintained. On the other hand, in the case of Comparative Example, since the degassing process was not performed during the activation process, it seems that the gas generated in the lithium secondary battery during the activation process interfered with the SEI formation or participated in a side reaction. Accordingly, it is expected that the comparative lithium secondary battery has an insignificant SEI film formation reaction, and thus cycle degradation is caused as the electrolyte decomposition reaction is deepened during the cycle.

From these results, the method of activating a lithium secondary battery according to the present disclosure has an advantage that the safety of the battery can be improved because the total amount of gas generated during charging and discharging can be reduced by performing at least one degassing step for removing the gas inside the secondary battery during the activation step. In addition, it is possible to improve the charging/discharging capacity of the lithium secondary battery and the capacity retention rate after repeated use.

While the foregoing has been described with reference to preferred embodiments of the present disclosure, it should be understood by those skilled in the art or by those of ordinary skill in the art that various changes and modifications can be made therein without departing from the spirit and scope of the disclosure as set forth in the claims that follow.

Accordingly, the technical scope of the present disclosure should not be limited to the content described in the detailed description of the specification, but should be defined by the claims.

The invention claimed is:

1. A method of activating a lithium secondary battery, comprising:

charging the lithium secondary battery to a state of charge (SOC) of 90% or more in an activation step, wherein the lithium secondary battery having an electrode assembly comprising a positive electrode and an electrolyte, wherein the positive electrode comprises a mixture layer having a positive electrode active material and a positive electrode additive; and degassing the lithium secondary battery during the activation step to remove gas inside the secondary battery, wherein the activation step further comprises:

a first activation step wherein the lithium secondary battery is charged to a first level of SOC of 20% or less;

a second activation step wherein the lithium secondary battery is charged to a second level of SOC of greater than 20% and 40% or less;

a third activation step wherein the lithium secondary battery is charged to a third level of SOC of greater than 40% and 70% or less; and a fourth activation step wherein the lithium secondary battery is charged to a fourth level of SOC of 90% or more, wherein the degassing is performed between the first and second activation steps at the first level of SOC, the second and third activation steps at the second level of SOC, and the third and fourth activation steps at the third level of SOC.

2. The method of claim 1, wherein, during the third to fourth activation steps, charging of the lithium secondary battery is performed at a rate of more than 0.5 C.

3. The method of claim 1, wherein the activation step further comprises:

pressurizing the lithium secondary battery.

4. The method of claim 1, wherein the activation step is performed at a temperature of 40° C. to 70° C.

5. The method of claim 1, wherein the positive electrode additive includes a lithium cobalt oxide represented by the following Chemical Formula 1:

[Chemical Formula 1]

$$Li_pCo_{(1-q)}M^1_qO_4$$

wherein $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, $5 \leq p \leq 7$; and $0 \leq q \leq 0.5$.

6. The method of claim 5, wherein, in Chemical Formula 1, $M^1$ is Zn, and $0.2 \leq q \leq 0.4$.

7. The method of claim 1, wherein the content of the positive electrode additive is 0.1 to 5 wt % based on the total weight of the mixture layer.

8. The method of claim 1, further comprising:

aging the lithium secondary battery at a temperature of 40° C. to 80° C. after the activation step.

* * * * *